US010891599B2

United States Patent
Abel

(10) Patent No.: US 10,891,599 B2
(45) Date of Patent: Jan. 12, 2021

(54) USE OF STATE OBJECTS IN NEAR FIELD COMMUNICATION (NFC) TRANSACTIONS

(75) Inventor: Miller Abel, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1304 days.

(21) Appl. No.: 13/611,333

(22) Filed: Sep. 12, 2012

(65) Prior Publication Data

US 2014/0074722 A1 Mar. 13, 2014

(51) Int. Cl.
*G06Q 20/04* (2012.01)
*G06Q 20/32* (2012.01)
*H04B 5/00* (2006.01)
*G06Q 20/22* (2012.01)
*G07B 15/00* (2011.01)

(52) U.S. Cl.
CPC ......... *G06Q 20/045* (2013.01); *G06Q 20/223* (2013.01); *G06Q 20/32* (2013.01); *G06Q 20/3278* (2013.01); *H04B 5/0031* (2013.01); *G07B 15/00* (2013.01)

(58) Field of Classification Search
None
See application file for complete search history.

(56) References Cited

U.S. PATENT DOCUMENTS

| | | | | |
|---|---|---|---|---|
| 4,405,829 | A * | 9/1983 | Rivest | H04L 9/302 380/255 |
| 5,455,953 | A * | 10/1995 | Russell | G06F 21/33 710/266 |
| 5,831,547 | A * | 11/1998 | Ohtsuki | G07B 15/02 340/10.41 |
| 5,862,325 | A * | 1/1999 | Reed | H04L 29/06 704/270.1 |
| 6,085,224 | A | 7/2000 | Wagner | |
| 6,279,111 | B1 * | 8/2001 | Jensenworth | G06F 21/335 713/159 |
| 6,327,578 | B1 * | 12/2001 | Linehan | 705/65 |
| 6,345,288 | B1 * | 2/2002 | Reed | H04L 63/045 707/999.001 |

(Continued)

OTHER PUBLICATIONS

"NFC—Near Field Communication", Retrieved at <<http://www.infineon.com/cms/en/product/applications/chip-card-and-security/nfc/index.html>> Retrieved Date: Feb. 21, 2012, pp. 6.

(Continued)

*Primary Examiner* — Mamon Obeid
(74) *Attorney, Agent, or Firm* — Holzer Patel Drennan

(57) ABSTRACT

A near field communication (NFC)-enabled client device includes one or more computer-readable storage media and an NFC interface component operational in a card emulation mode of an NFC protocol. The client device also includes an application for performing a transaction using the NFC protocol. The application is stored on the one or more computer-readable storage media. Programming logic is configured to receive and store a state object (e.g., a cookie) provided by a security authority using the NFC protocol when performing a transaction using the application. The state object includes an identifier, data payload and a public key associated with the security authority. The programming logic is also configured to transmit the state object to the security authority upon receiving an HTTP operation identifying the state object.

15 Claims, 4 Drawing Sheets

(56) References Cited

U.S. PATENT DOCUMENTS

| | | | |
|---|---|---|---|
| 6,351,812 B1* | 2/2002 | Datar | G06F 21/33 713/164 |
| 7,194,621 B1* | 3/2007 | Nguyen | H04L 63/0442 713/162 |
| 7,337,332 B2* | 2/2008 | Tsuria | G06F 21/10 380/281 |
| 7,845,568 B2* | 12/2010 | Parlange | G06K 19/0723 235/492 |
| 8,102,797 B2 | 1/2012 | Abel | |
| 8,151,345 B1* | 4/2012 | Yeager | G06Q 20/367 235/375 |
| 8,333,321 B2* | 12/2012 | Gressel | G06Q 20/352 235/382 |
| 8,768,838 B1* | 7/2014 | Hoffman | G06Q 40/00 705/44 |
| 9,307,034 B1* | 4/2016 | Keyani | H04L 67/10 |
| 9,640,002 B1* | 5/2017 | Grosberg | G07C 9/00571 |
| 9,754,245 B1* | 9/2017 | Davison | G06Q 20/12 |
| 10,050,787 B1* | 8/2018 | Johansson | G06F 21/57 |
| 10,089,801 B1* | 10/2018 | Musabeyoglu | G07C 9/20 |
| 10,360,363 B1* | 7/2019 | Grosberg | G06F 21/34 |
| 10,419,541 B2* | 9/2019 | Harrison | H04L 67/16 |
| 10,554,405 B1* | 2/2020 | Endress | H04L 9/088 |
| 10,764,273 B2* | 9/2020 | Mohamad Abdul | H04L 67/26 |
| 2001/0023442 A1* | 9/2001 | Masters | H04L 67/1008 709/227 |
| 2002/0023121 A1* | 2/2002 | Sugiyama | H04B 1/20 709/201 |
| 2002/0049900 A1* | 4/2002 | Patrick | H04L 63/0442 713/151 |
| 2002/0107054 A1* | 8/2002 | Fujisawa | G07B 15/00 455/573 |
| 2002/0111907 A1* | 8/2002 | Ling | 705/41 |
| 2002/0193142 A1* | 12/2002 | Stavenow | G06F 21/41 455/556.1 |
| 2003/0065528 A1* | 4/2003 | Matsumoto | G06Q 20/382 705/5 |
| 2003/0070091 A1* | 4/2003 | Loveland | H04W 12/0608 726/12 |
| 2003/0131073 A1* | 7/2003 | Lucovsky | H04L 67/303 709/219 |
| 2003/0163522 A1* | 8/2003 | Nakamura | H04L 63/104 709/203 |
| 2004/0078604 A1* | 4/2004 | Rice | H04L 63/08 726/5 |
| 2004/0172536 A1* | 9/2004 | Malville | H04W 12/04031 713/169 |
| 2004/0238624 A1* | 12/2004 | Nakano | G07F 7/1008 235/380 |
| 2005/0154887 A1 | 7/2005 | Birk et al. | |
| 2005/0182956 A1* | 8/2005 | Ginter | G06F 21/10 713/193 |
| 2005/0221803 A1* | 10/2005 | Hayashi | G07C 9/27 455/413 |
| 2005/0258237 A1* | 11/2005 | Urakami | G06Q 20/3221 235/380 |
| 2006/0143134 A1* | 6/2006 | So | G06F 21/10 705/59 |
| 2007/0022058 A1* | 1/2007 | Labrou et al. | 705/67 |
| 2007/0082704 A1* | 4/2007 | Nakano | G07B 15/02 455/558 |
| 2007/0150452 A1* | 6/2007 | Tsurumaki | G06F 16/9535 |
| 2007/0180227 A1* | 8/2007 | Akimoto | H04L 63/1408 713/153 |
| 2007/0198434 A1* | 8/2007 | Jang | G06F 21/10 705/67 |
| 2007/0289002 A1* | 12/2007 | van der Horst | G06F 21/42 726/9 |
| 2008/0016336 A1 | 1/2008 | Stirbu et al. | |
| 2008/0113655 A1 | 5/2008 | Angelhag | |
| 2008/0126929 A1 | 5/2008 | Bykov | |
| 2008/0223918 A1* | 9/2008 | Williams | G06Q 20/342 235/379 |
| 2008/0235138 A1* | 9/2008 | Yokota | G06Q 10/02 705/52 |
| 2008/0277482 A1* | 11/2008 | Parlange | G06K 19/0723 235/492 |
| 2009/0125429 A1* | 5/2009 | Takayama | G06Q 20/105 705/35 |
| 2009/0150518 A1* | 6/2009 | Lewin | H04L 67/2842 709/219 |
| 2009/0178123 A1* | 7/2009 | Carpenter | H04L 63/08 726/5 |
| 2009/0193500 A1 | 7/2009 | Griffin et al. | |
| 2009/0271847 A1* | 10/2009 | Karjala | H04L 63/0807 726/6 |
| 2009/0312011 A1* | 12/2009 | Huomo | G06K 7/0008 455/426.1 |
| 2010/0227553 A1 | 9/2010 | Charrat et al. | |
| 2011/0065385 A1* | 3/2011 | Geslin et al. | 455/41.1 |
| 2011/0264586 A1* | 10/2011 | Boone et al. | 705/67 |
| 2011/0312271 A1 | 12/2011 | Ma et al. | |
| 2012/0005193 A1* | 1/2012 | Nemoto | G06F 16/185 707/722 |
| 2012/0034868 A1 | 2/2012 | Fine et al. | |
| 2012/0057741 A1* | 3/2012 | Macklin | G01N 21/78 382/100 |
| 2012/0075057 A1* | 3/2012 | Fyke | G07C 9/27 340/5.3 |
| 2012/0075059 A1* | 3/2012 | Fyke | H04W 4/80 340/5.21 |
| 2012/0077431 A1* | 3/2012 | Fyke | G07C 9/20 455/41.1 |
| 2012/0078727 A1* | 3/2012 | Lee | G06Q 30/02 705/14.66 |
| 2012/0096277 A1* | 4/2012 | Perez Soria | 713/179 |
| 2012/0143763 A1* | 6/2012 | Karp | G06Q 20/20 705/44 |
| 2012/0190386 A1* | 7/2012 | Anderson | G01S 19/14 455/456.3 |
| 2012/0196529 A1* | 8/2012 | Huomo | H04B 5/0031 455/41.1 |
| 2012/0220216 A1* | 8/2012 | Carbonell Duque | H04B 5/0031 455/26.1 |
| 2013/0007470 A1* | 1/2013 | Violleau | G06F 21/54 713/193 |
| 2013/0091359 A1* | 4/2013 | Guo | H04L 63/162 713/171 |
| 2013/0139241 A1* | 5/2013 | Leeder | H04L 63/0815 726/9 |
| 2013/0185167 A1* | 7/2013 | Mestre et al. | 705/21 |
| 2013/0318157 A1* | 11/2013 | Harrison | H04L 67/16 709/203 |
| 2013/0331027 A1* | 12/2013 | Rose | H04W 12/0609 455/41.1 |
| 2014/0040633 A1* | 2/2014 | Leleu | 713/189 |
| 2014/0040673 A1* | 2/2014 | Carey et al. | 714/48 |
| 2014/0074722 A1* | 3/2014 | Abel | G06O 20/3278 705/71 |
| 2014/0189808 A1* | 7/2014 | Mahaffey | H04L 63/0853 726/4 |
| 2014/0365304 A1* | 12/2014 | Showers | G01S 5/0252 705/14.55 |
| 2015/0089614 A1* | 3/2015 | Mathew | H04L 65/1069 726/7 |
| 2015/0172059 A1* | 6/2015 | Tredoux | H04L 63/0492 713/176 |
| 2015/0220917 A1* | 8/2015 | Aabye | G06Q 20/3278 705/64 |
| 2015/0244706 A1* | 8/2015 | Grajek | H04W 12/0609 726/6 |
| 2015/0339599 A1* | 11/2015 | Lee | G06Q 20/401 705/51 |
| 2016/0110537 A1* | 4/2016 | Harrison | G06F 21/53 705/14.66 |

(56) References Cited

U.S. PATENT DOCUMENTS

| | | | |
|---|---|---|---|
| 2016/0112770 A1* | 4/2016 | Harrison | H04L 67/10 725/31 |
| 2016/0140122 A1* | 5/2016 | Harrison | H04N 21/4147 707/770 |
| 2016/0180618 A1* | 6/2016 | Ho | G07C 9/00563 340/5.52 |
| 2016/0307380 A1* | 10/2016 | Ho | G07C 9/00309 |
| 2017/0041655 A1* | 2/2017 | Harrison | H04N 21/4782 |
| 2017/0085651 A1* | 3/2017 | Harrison | G06F 21/53 |
| 2017/0289197 A1* | 10/2017 | Mandyam | H04L 63/06 |
| 2018/0108192 A1* | 4/2018 | Ho | G07C 9/00896 |
| 2018/0144563 A1* | 5/2018 | Reymann | E06B 11/02 |
| 2019/0005496 A1* | 1/2019 | Noe | G06Q 20/3827 |
| 2019/0188424 A1* | 6/2019 | Washiro | H04B 1/3877 |
| 2019/0206231 A1* | 7/2019 | Armstrong | H04W 4/029 |
| 2019/0280875 A1* | 9/2019 | Ragnoni | G07F 17/326 |
| 2019/0306138 A1* | 10/2019 | Carru | H04L 63/0428 |
| 2019/0312857 A1* | 10/2019 | Lander | G06F 3/0607 |
| 2019/0319940 A1* | 10/2019 | Hamel | H04L 9/3271 |
| 2019/0325424 A1* | 10/2019 | Yeddula | G06F 8/61 |
| 2020/0007530 A1* | 1/2020 | Mohamad Abdul | H04L 63/0815 |
| 2020/0036528 A1* | 1/2020 | Ortiz | G06F 21/32 |

OTHER PUBLICATIONS

Medaglia, Et al., "Services, Use Cases and Future Challenges for Near Field Communication: the StoLPaN Project", Retrieved at <<http://www.intechopen.com/source/pdfs/17867/InTech-Services_use_cases_and_future_challenges_for_near_field_communication_the_stolpan_project.pdf>> Retrieved Date: Feb. 21, 2012, pp. 265-290.

Shannon, Ross, "Basic JavaScript", Retrieved at <<http://www.yourhtmlsource.com/javascript/basicjavascript.html>> Retrieved Date: Feb. 26, 2013, pp. 5.

Shannon, Ross, "Cookies", Retrieved at <<http://www.yourhtmlsource.com/javascript/cookies.html>> Retrieved Date: Feb. 26, 2013, pp. 4.

* cited by examiner

USE OF STATE OBJECTS IN NEAR FIELD COMMUNICATION (NFC) TRANSACTIONS

BACKGROUND

Wireless mobile devices have become commonplace. They enable users unrestricted movement while still maintaining communications through a variety of means. Some devices utilize long-range communications such as satellite or wireless telephone technologies. Others employ shorter range communications such as Bluetooth devices. Although shorter range communications may at first appear to be a disadvantage, they actually allow better discrimination between the sender and receiver. For example, Bluetooth devices can be limited to 30 to 60 foot areas of communication. This drastically reduces interference with other users. Unfortunately, Bluetooth technology requires 'discovery' by a device in order to find other Bluetooth sources. In meeting environments where there are many users, a Bluetooth discovery session may uncover multiple users and devices with very similar identification tags. This makes it hard for a user to discriminate as to which users or devices they would like to connect with.

Near field communications (NFC) have been developed to eliminate some of the inconveniences of current communication technologies while allowing fast, secure connections of devices in close proximity to one another. The European Computer Manufacturer's Association (ECMA) has developed a standard for near field communications, NFCIP-1 (ECMA-340, ISO/IEC 18092) Near Field Communication Interface and Protocol. This standard for NFC in mobile devices has been harmonized with the ISO/IEC 14443 standard for contactless smart cards allowing mobile devices to emulate contactless smart cards in payment, access, and transit applications. The NFC Forum, an industry consortium that specifies best practices for the development and use of NFC in consumer electronics and mobile devices, has specified additional guidelines for NFC in those devices. These standards guide manufacturers in developing NFC compatible devices. One of the main advantages of NFC is that two devices can automatically create a wireless communication link when they are brought into close proximity of each other. This enables information to be quickly shared between the devices. For example, in meetings, business card information can be easily shared by bringing NFC devices next to each other. The proximity restrictions allow NFC devices to discriminate amongst other NFC devices to control the flow of information without requiring the entry of codes or the selection of network or device names from a menu. The simple tapping together of the devices to initiate information exchange is both selective and intentional.

To support the use of secure service applications, it is common practice to use a hardware security device in the NFC-enabled device, which is commonly called a secure element. The use of such a secure element requires both business and technical integration to ensure the integrity of the secure element and this can restrict application providers from offering services that make use of the NFC protocol, preventing the widespread adoption of the various NFC applications.

SUMMARY

In one implementation a protocol is provided which supports the writing of a small package of service data to an NFC-enabled device upon first presentation of the device to the NFC service point. The service data may be a state object such as a cookie which is opaque to the user. Such service data can later be retrieved by any compatible NFC service point using the NFC protocol when a transaction such as an electronic payment for a service or product or access authorization is being performed. The service can use the service data to validate or authorize the transaction. In this way a secure transaction can be performed without the need for any prior exchange of keys with the NFC device and without the requirement for a secure element.

In one particular implementation the state object may include an identifier, a data payload and a public key associated with a security authority. The identifier, the data payload and the public key may be digitally signed by the security authority. When a transaction is to be performed the server or the like involved in the transaction sends a read request to the NFC-enabled device. The read request includes the identifier of the state object. The identifier may be digitally signed using the private key of the security authority. The NFC-enabled device can authenticate the service point and validate the read request by verifying the digital signature of the security authority using the public key of the security authority previously saved with the state object. If the read request is validated, the client sends the state object to the server in accordance with the NFC protocol. Based on the data in the state object, the server may authorize the transaction to proceed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Instances disclosed herein are applicable to various types of short-range wireless communication systems. One of the more recent short-range wireless communication types is called near field communications or "NFC." NFC is a standards-based, short-range (a few centimeters) wireless connectivity technology that enables simple and safe two-way interactions among electronic devices. NFC devices can change their mode of operation to be in reader/writer, peer-to-peer, or card emulation mode. The different operating modes, which are based on the ISO/IEC 18092 NFCIP-1 and ISO/IEC 14443 contactless smart card standards, include reader/writer mode, peer-to-peer mode and card emulation mode.

In reader/writer mode, the NFC device can read NFC tags. In peer-to-peer mode, devices can exchange data. Peer-to-peer mode is standardized in ISO/IEC 18092 standards.

Figure 1:
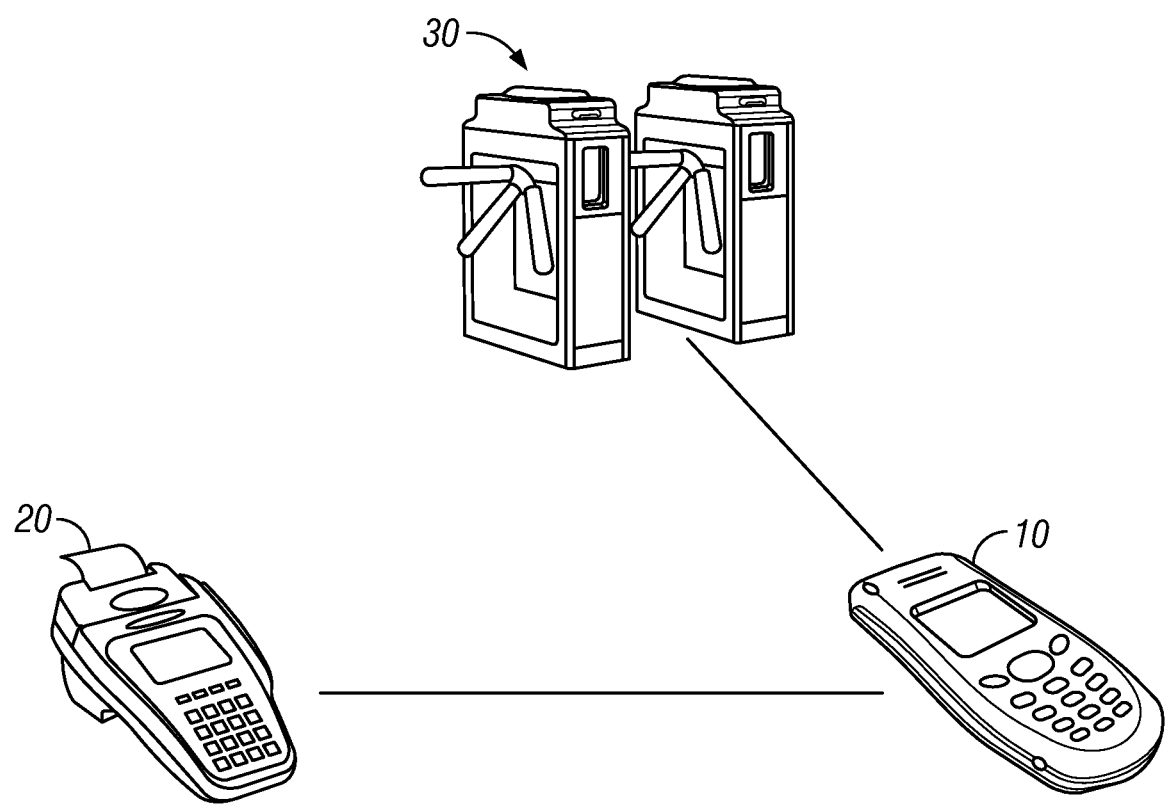
FIG. 1 shows an example of an NFC-enabled wireless communication device operating in card emulation mode.

In card emulation mode, a device can act as a smart card or tag, appearing to an external reader much the same as a traditional contactless smart card. A tag is typically a passive device that stores data read by an NFC-enabled device. This allows, for example, contactless payments and ticketing and the like. FIG. 1 shows an example of NFC-enabled wireless communication device operating in card emulation mode. In this example payment information stored in the NFC-enabled wireless communication device 10 is read by a reader in a payment machine such as a point-of-sale terminal 20 or a turnstile entrance 30 to a venue such as a train, park or the like.

Of course, short-range wireless communication technologies other than NFC may be employed by the subject matter described herein to establish communication between a reader and a tag. Such short-range wireless communication technologies may be incorporated in standards or proprietary. One example of a proprietary technology is the Sony TransferJet™, which employs a powered data tag that can store more information than an NFC tag. Other examples of standards that may be employed include Zigbee, RFID and Bluetooth 4.0.

As previously mentioned, a secure hardware element is often used to support the use of secure service applications in NFC-enabled devices. A single security authority manages each secure element and determines which applications and data may be stored in the secure element and who may have access. Presently, in NFC-enabled mobile devices that include a secure element—whether fixed or removable—the ability to incorporate the secure element into a service application is highly restricted by business policies and the need to vet individual service applications. These restrictions have a constraining effect on a service provider's ability to scale their service to reach consumers, who are generally equipped with a wide variety of different models of mobile devices from different manufacturers, which may each utilize network services provided by one of many different network operators.

While the existing restrictions on the provisioning of the secure elements serve the purpose of providing security assurances to financial institutions, for instance, who issue payment credentials for inclusion in NFC-enabled mobile devices, it would be desirable to provide a mechanism by which other service providers can take advantage of the NFC card emulation mode without requiring the high security assurances used by financial institutions. For instance, transactions involving merchant loyalty programs, gym club membership credentials, discount coupons, and other applications might benefit from the ease of use and increasing availability of NFC-enabled mobile devices which already operate in the card emulation mode to support payment applications.

Figure 2:
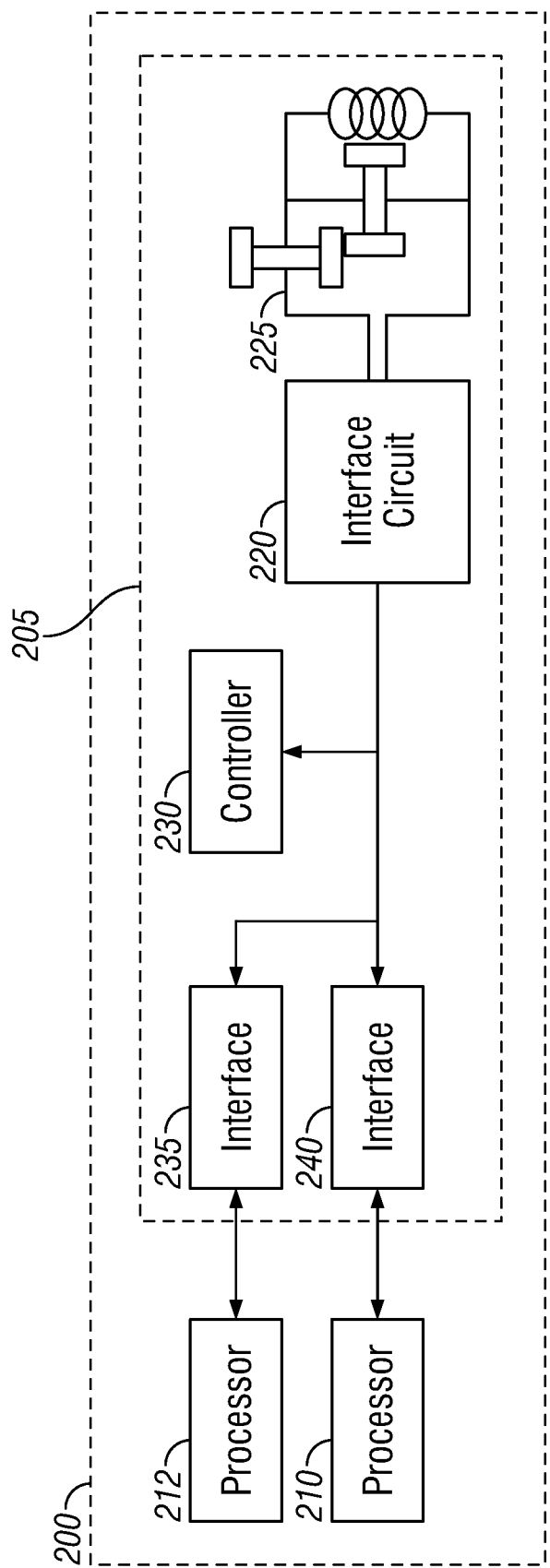
FIG. 2 shows one example of an architecture of an NFC component that may be employed in a mobile device.

FIG. 2 shows one example of an architecture of an NFC component that may be employed in portable devices such as mobile communication devices (e.g., mobile phones), laptops, tablets, Personal Digital Assistants (PDAs) and the like. The NFC component 200 includes an NFC front-end 205 and first and second host processors 210 and 212. The first host processor 210 is often the main processor of the device in which the NFC component 200 is integrated, whereas the second host processor 212 is generally a secure circuit. The first host processor 210 is usually a non-secure processor, and, may be, for example, a baseband circuit of a mobile phone. The second host processor 212 may be for example, a Subscriber Identity Module (SIM) card (e.g., the micro controller present in a SIM card). The NFC front-end 205 includes an interface circuit 220 for contactless data sending/receiving, which is equipped with an antenna circuit 225, wire communication interfaces 235 and 240 linked to the interface circuit 220, and a controller 230. The interface 240 is in communication with the host processor 210 and the interface 235 is in communication with the host processor 212. In some case all the elements of the NFC front-end 205 shown in FIG. 2 are included in a single NFC chipset.

Second host processor 212 typically has an associated secure memory that is conventionally used to secure passwords, identifiers, account information and the like. For instance, when a mobile device operates in the card emulation mode to support a payment transaction, the secure memory may store payment credentials. As previously mentioned, it would be desirable to be able to provide secure applications that make use of the NFC card emulation mode and which do not require use of the secure memory.

To avoid the need for the security authority controlling access to a financial or other service provider to interact with the secure host processor, a mechanism is provided to support the writing of a small amount of service data to an NFC-equipped mobile device with defined retention and integrity guarantees. As detailed below, this mechanism is based on the HTTP state management mechanism that is universally implemented in web browsers.

The HTTP state management mechanism involves state objects, which can be used in connection with "stateless" protocols including but not limited to the HTTP application-level protocol. "State" information is information about a communication between a client and a server. In a stateless protocol, the server does not store any information about a particular transaction that occurs in accordance with that protocol; each connection between a client and a server is "fresh" and has no knowledge of any previous HTTP transactions. In some cases it is useful to maintain state information about the user across multiple transactions, e.g., HTTP transactions.

More specifically, the HTTP state management mechanism is a general mechanism which server side connections (e.g., web sites) can use to both store and retrieve information on the client (e.g., user) side of the connection. The addition of a simple, persistent, client-side state significantly extends the capabilities of web-based client/server applications. Web sites use state objects to simulate a continuous connection to the web site. This makes it more convenient for users by allowing them to visit pages within a site without having to reintroduce themselves with each mouse click. In a security application, state objects may allow the user to access various applications without the need to re-authenticate the user, as the user's authorizations can be stored in a state object during the initial authentication.

In the context of the HTTP protocol, the state object is often referred to as a "cookie" or "HTTP cookie," which is generally a small text file. While the subject matter described herein may employ state objects which can be used in connection with any application-level or other protocol, for purposes of illustration only the following discussion will be presented in terms of the HTTP protocol which employs cookies. Internet browsers, such as Microsoft's Internet Explorer®, are often set up to allow the creation of these state objects. The user, however, can specify that a prompt be provided before a web site puts a state object on the user's hard disk or memory. In this manner, the user can choose to accept or reject state objects. The user can also configure the browser to prevent the acceptance of any state objects.

The manner in which a cookie or other state object can be stored, updated, read and deleted by a security authority who controls access to a resource is discussed in the examples below, which are presented by way of illustration only and not as a limitation on the subject discussed herein.

Storing a Cookie

A security authority or other web site may store a cookie on a client device (e.g., wireless communication device 10 of FIG. 1) when returning an HTTP object or other network information to the client. Included in that state object is a description of the universal resource locators (URLs) for which that cookie is valid. Any future requests made by the client to one of those URLs will include a transmittal of the current value of the cookie back to the web site. Web sites can thus "remember" information about users to facilitate their preferences for a particular site. In a security application, cookies can store authentication information indicating the applications, servers, or other resources that the user is authorized to access. Other information which may be included in a cookie used for security purposes is shown in Table 1.

TABLE 1

Contents of PUT COOKIE request

| Field | Description |
|---|---|
| ID | A URI that uniquely identifies the cookie |
| Friendly Name | A human readable name to identify the cookie in the handset wallet |
| Expires | The date and time, relative to UTC, after which the cookie is no longer valid, will no longer be retained, and is no longer retrievable |
| Public Key | The service authority's public key |
| Payload | Opaque data string |
| Signature | The signature hash of all fields in the cookie package except the signature field (signed using service authority's private key) |

In one implementation, a security authority or other web site can store a cookie on the client device using conventional HTTP operations such as a PUT request. When a cookie is sent to the client device, the contents of the PUT request are verified against the public key supplied with the request, assuming the specified ID does not already exist. This ensures that the cookie is later retrievable by the entity that created it. If the signature verifies, a new cookie is created and the friendly name, public key, expiration, opaque payload, and request signature are saved, indexed by the cookie ID. Of course, in those implementations that employ protocols other than HTTP, alternative operations suitable for those protocols may be used to store the cookie or other state object. Such alternative protocols and operations may also be employed when performing any of the other processes discussed below, such as updating and reading a cookie, for instance.

Updating a Cookie

In one implementation, a security authority or other web site can update cookies using the same PUT operation used to create them. This reduces the number of potential data exchanges and simplifies the protocol. If a cookie with the ID specified in the PUT request already exists, the signature hash of the PUT request is verified using the stored public key previously associated with the cookie ID. If the request signature is not valid, the PUT request fails and a defined status is returned. If the signature is valid, the cookie is updated with the material supplied in the PUT request. It is generally not possible to change the cookie ID once a cookie has been created, though the cookie may be deleted and a new one issued during the same NFC transaction between the server and client device.

In one implementation, when updating an existing cookie, all fields are required and all fields overwrite any previously stored values. The signature of the cookie may also be retained to ensure the cookie is not tampered with prior to retrieval. A PUT request that does not contain all required fields fails and a defined status is returned.

Reading a Cookie

In one implementation, a security authority or other web site can retrieve a cookie by using an HTTP GET operation. As shown in Table 2, the request may include the ID of the desired cookie and a signature of all fields in the request other than the signature field (and signed using the service authority's private key).

TABLE 2

Contents of GET COOKIE request

| Field | Description |
|---|---|
| ID | A unique identifier for the cookie |
| Signature | The signature of the all fields in the request other than the signature (signed using the service authority's private key) |

The client device may attempt to validate the GET request by verifying the signature in the request using the public key previously stored and associated with the cookie. If the ID does not exist or the request signature is not valid, the GET request fails and a defined status is returned. If the signature on the GET request is valid, the contents of the cookie are returned to the client device, with the original signature that accompanied the most recent PUT request. Table 3 shows one example of information that may be included in a GET COOKIE response.

TABLE 3

Contents of GET COOKIE response

| Field | Description |
|---|---|
| ID | A unique identifier for the cookie |
| Friendly Name | A human readable name to identify the cookie in the handset wallet |
| Expires | The date and time, relative to UTC, after which the cookie is no longer valid, will no longer be retained, and is no longer retrievable |
| Payload | Opaque data string to be saved in secure memory |
| Signature | The signature of all fields in the original cookie package except the signature field |

Deleting a Cookie

For service-dependent reasons, a service authority may wish to revoke a cookie and remove it from the client device. This is accomplished using the HTTP DELETE operation by supplying the ID of the cookie to be deleted. As shown in Table 4, the DELETE request may include a signature of all fields in the request other than the signature field (and signed using the service authority's private key).

TABLE 4

Contents of DELETE COOKIE request

| Field | Description |
|---|---|
| ID | A unique identifier for the cookie |
| Signature | The signature of the all fields in the request other than the signature (signed using the service authority's private key) |

The client device may attempt to validate the DELETE request by verifying the signature of the request using the previously stored public key associated with the cookie. If the ID does not exist or the signature cannot be verified, the DELETE request fails and a defined status is returned. If the signature on the DELETE request is valid, the contents of the cookie are purged from the cookie store and are no longer retained and can no longer be retrieved. A defined status is returned to the web site confirming the successful request.

Client Device User Interface

Generally, in some implementations, the client device may have a user interface that allows the user to manage the contents of the cookie store. Such an interface may allow the user, for instance, to display the friendly names and expirations of each retained cookie and to discard any stored cookie. Since the cookie payload is opaque to the user and service-specific, the integrity of all the cookie data fields is secured with the digital signature of the service authority.

The payload or any other of the cookie fields generally cannot be modified by the user.

As an exception to this restriction, the user can generally delete any cookie without supplying a valid signature. This is analogous to cookie management interfaces within Internet web browsers. It may further be desirable to enable the user to block or suspend cookie operations either temporarily or permanently. It may also be desirable to ask for user confirmation before saving a new cookie in the cookie store. Finally, maintaining the date and time of the last GET or PUT request of each cookie, and any failed GET, PUT, or DELETE attempts, may be useful to improve transparency and thereby build trust in the system.

Example Method

Figure 3:
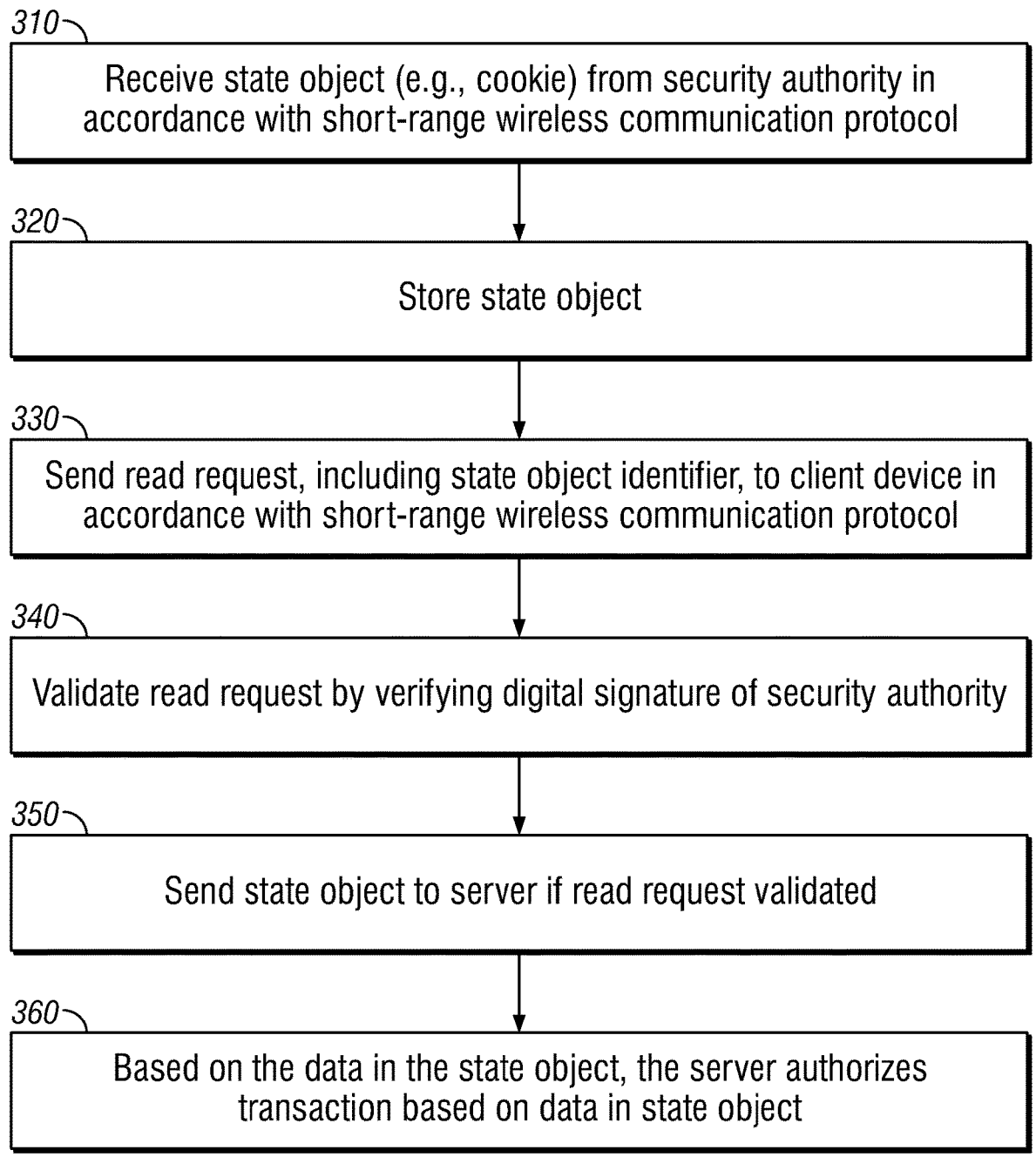
FIG. 3 is a flowchart showing one example of a method for handling client state information during a transaction performed using a short-range wireless communication protocol.

FIG. 3 is a flowchart showing one example of a method for handling client state information during a transaction performed using a short-range wireless communication protocol. The method begins as block 310 when a client device such as a mobile communication device, for example, receives a state object from a security authority in accordance with a short-range wireless communication protocol. The state object, which may be a cookie, includes an identifier, a data payload and a public key associated with the security authority. The identifier, the data payload and the public key are digitally signed by a security authority. The client device stores the state object at block 320. At some subsequent time a server or the like sends a read request to the client device in accordance with the short-range wireless communication protocol at block 330. The read request may be responsive to the initiation of a transaction such as an electronic payment, for example. The read request includes the identifier of the state object. The identifier may be digitally signed using the private key of the security authority. At block 340 the client device validates the read request by verifying the digital signature of the security authority using the public key of the security authority. If the read request is validated, the client sends the state object to the server at block 350 in response to the read request. The state object is sent in accordance with the short-range wireless communication protocol. Based on the data in the state object, the server may authorize the transaction to proceed at block 360.

Example Mobile Device

Figure 4:
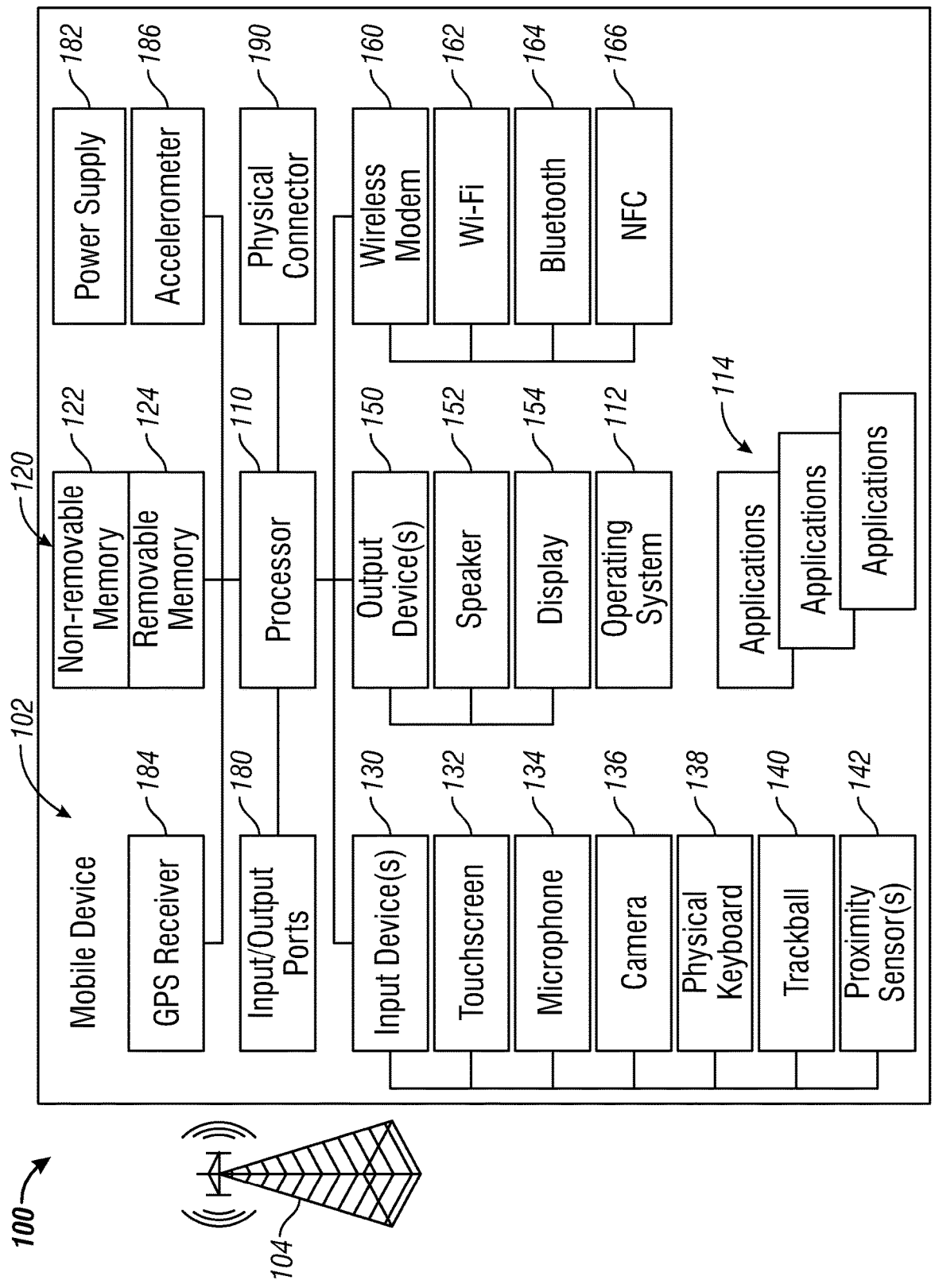
FIG. 4 is a system diagram depicting one example of a mobile device.

FIG. 4 is a system diagram depicting an exemplary client device 100 (e.g., a mobile device) including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, tablet or other handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102, including power states, above-lock states, and below-lock states, and provide support for one or more application programs 114. The application programs can include common mobile computing applications (e.g., image-related applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130 for responding to inputs from users and other sources. Such input devices may include a touch screen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touch screen 132 and display 154 can be combined into a single input/output device.

In some implementations the various input devices 130 may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft® is working include touch sensitive displays, voice and speech recognition, intention and goal understanding, motion gesture detection using depth cameras (such as stereoscopic camera systems, infrared camera systems, red-green-blue (rgb) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN). The mobile device also includes an NFC component 166, such as the NFC component shown in FIG. 2, for example.

The mobile device can further include at least one input/output port 180, a power supply 182, a satellite navigation system receiver 184, such as a Global Positioning System (GPS) receiver, an accelerometer 186, a gyroscope (not shown), and/or a physical connector 190, which can be a USB port, IEEE 1394 (FireWire) port, and/or RS-232 port. The illustrated components 102 are not required or all-inclusive, as any components can be deleted and other components can be added.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide an improved user experience with mobile devices, including mobile devices such as smart phones.

Any of the methods described herein can be performed via one or more computer-readable media (e.g., storage or other tangible media that does not include a propagating signal) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. For example, any technologies described herein for capturing still photos can also be adapted for capturing video. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

The invention claimed is:

1. A method of handling client state information in a wireless device during a transaction performed using a short-range wireless communication protocol, comprising:
   receiving, by the wireless device, a state object from a security authority, the state object including an identifier, data payload, a public key, and a digital signature of the security authority, and a description of a plurality of universal resource locators for which the state object is valid, wherein the wireless device includes secure memory associated with a secure processor and non-secure memory associated with a non-secure processor;
   storing, by the wireless device, the state object in a cookie store of the wireless device, wherein the cookie store is located in the non-secure memory associated with the non-secure processor;
   receiving, by the wireless device, a read request for the state object responsive to transmission of an electronic payment request over the short-range wireless communication protocol, the read request also being delivered over the short-range wireless communication protocol and including a digital signature of the security authority;
   validating, by the wireless device, the digital signature included in the read request using both the public key and the digital signature included in the state object; and
   in response to the validation of the digital signature included in the read request, supplying, by the wireless device, the state object over the short-range wireless communication protocol.

2. The method of claim 1, wherein the data payload is opaque to the user and accessible to the security authority.

3. The method of claim 1, further comprising digitally signing the identifier, the data payload, and the public key using a private key of the security authority.

4. The method of claim 3, wherein the read request includes the identifier of the state object, the identifier being digitally signed using the private key of the security authority.

5. The method of claim 1, wherein the state object is associated with a single service associated with the transaction.

6. The method of claim 1, wherein the short-range wireless communication protocol is at least one of a Near Field Communication (NFC) protocol, a Bluetooth protocol, a Zigbee protocol, or a radio frequency identification (RFID) protocol.

7. The method of claim 6, wherein the state object is received and stored by an NFC-enabled device operating in a peer-to-peer mode.

8. An NFC-enabled client device, comprising:
   secure memory associated with a secure processor;
   non-secure memory associated with a non-secure processor;
   an NFC interface component operational in a card emulation mode of an NFC protocol;
   an application for performing a transaction using the NFC protocol, said application being stored on the non-secure memory;
   programming logic stored on the non-secure memory and configured to:
   (i) receive and store a state object provided by a security authority using the NFC protocol when performing a transaction using the application, said state object including an identifier, data payload and a public key signed with a digital signature of the security authority, wherein the state object is stored in a cookie stored of the NFC-enabled client device, the cookie store being located in the non-secure memory associated with the non-secure processor; and (ii) receive a request for the state object responsive to transmission of an electronic payment request over a short-range wireless communication protocol, the read request also being delivered over the short-range wireless communication protocol and including a digital signature of the security authority;

(iii) validate the read request using both the public key and the digital signature included in the state object; and transmit the state object to the security authority over the short-range wireless communication protocol responsive to validation of the digital signature included in the read request.

9. The NFC-enabled client device of claim 8 in which the data payload is inaccessible to the user and accessible to the security authority.

10. The NFC-enabled client device of claim 9 in which the identifier, the data payload and the public key are digitally signed using a private key of the security authority.

11. The NFC-enabled client device of claim 10 in which the request is a read request that includes the identifier of the state object, said identifier being digitally signed using the private key of the security authority.

12. The NFC-enabled client device of claim 11 in which the programming logic is further configured to validate the read request by verifying the digital signature of the security authority using the public key of the security authority.

13. The NFC-enabled client device of claim 8 in which the state object is associated with a single service associated with the transaction.

14. The method of claim 1, wherein storing the state object in the cookie store of the wireless device comprises storing the state object in the cookie store of the wireless device using the non-secure processor.

15. The method of claim 14, further comprising using the secure processor to store a payment credential in a secure element of the secure memory, wherein the secure processor is a part of a subscriber identity module (SIM) card, and the secure processor is different than the non-secure processor.

* * * * *